G. S. JOHNSTON.
GOGGLES AND THE LIKE.
APPLICATION FILED APR. 11, 1919.
1,315,129.
Patented Sept. 2, 1919.
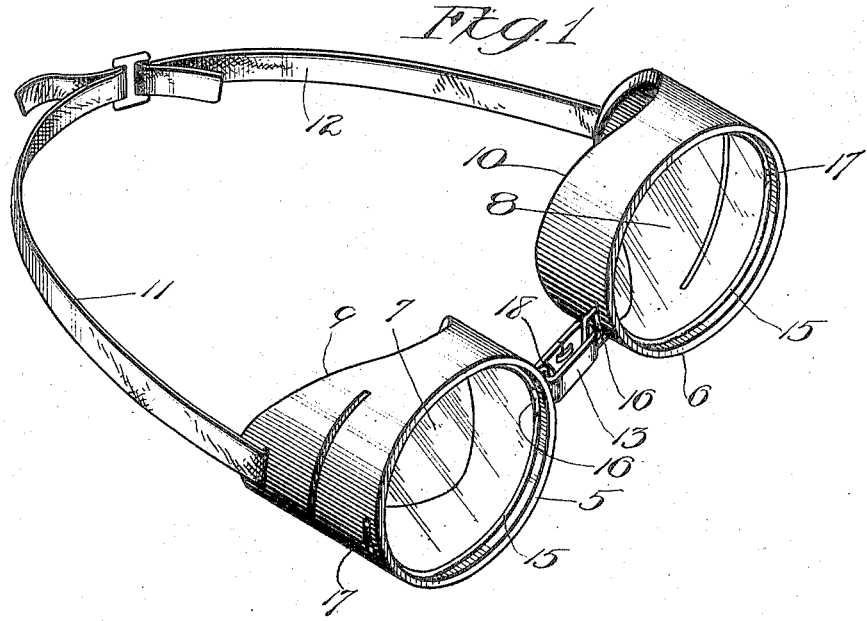
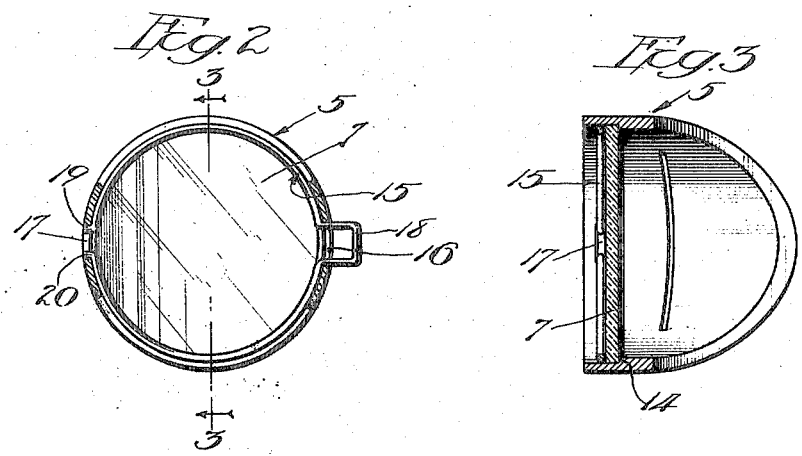
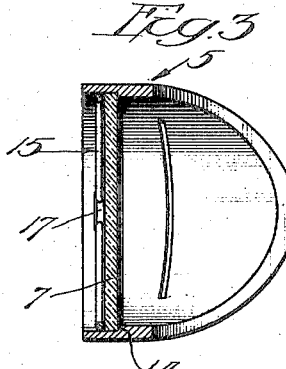
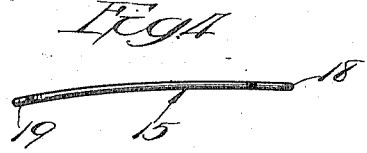
Witness:
Harry S. Gaither
Inventor:
George S. Johnston

UNITED STATES PATENT OFFICE.

GEORGE S. JOHNSTON, OF EVANSTON, ILLINOIS, ASSIGNOR TO GEO. S. JOHNSTON COMPANY, OF CHICAGO, ILLINOIS, A CORPORATION OF ILLINOIS.

GOGGLES AND THE LIKE.

1,315,129.　　　　　　Specification of Letters Patent.　　Patented Sept. 2, 1919.

Application filed April 11, 1919. Serial No. 289,452.

*To all whom it may concern:*

Be it known that I, GEORGE S. JOHNSTON, a citizen of the United States, residing at Evanston, county of Cook, and State of Illinois, have invented certain new and useful Improvements in Goggles and the like, of which the following is a specification.

The present invention has to do with improvements in goggles and has particular reference to improvements in goggles which are very well adapted for use by mechanics and operators in various lines of the applied arts.

While the features of the invention are very well adapted for use in conjunction with goggles intended for use by mechanics, it will be understood that said features are in no wise limited to such goggles, but in many cases will be found to be of great desirability and usefulness in connection with goggles for other purposes such, for instance, as automobile and motor vehicle drivers. One of the objects of the invention is to provide a very simple and inexpensive means for removably supporting the lenses in place in the lens holders, so that in case of breakage or in case it should be desirable to change either or both of said lenses, such change may be very readily effected and without the necessity of using special tools or equipment for this purpose.

Another object in this connection is to provide a very inexpensive and simple supporting and holding device, and at the same time one which will be very effective and satisfactory for the purpose intended.

Other objects and uses of the invention will appear from a detailed description of the same which consists in the features of construction and combinations of parts hereinafter described and claimed.

In the drawing:

Figure 1 shows a perspective view of a pair of goggles having applied thereto the features of the present invention;

Fig. 2 shows a front view of one of the lens holders having applied thereto the spring clip of the present invention;

Fig. 3 is a view taken on the line 3—3 of Fig. 2, looking in the direction of arrows; and Fig. 4 is an edge view of the clip itself when removed from the lens holder, this figure showing the fact that, when the clip illustrated in the drawing is removed, it springs into a curved or arcuate form.

Referring to the drawing the goggles therein illustrated includes the lens holders 5 and 6 within which are mounted the lenses or glass protectors 7 and 8. While in this specification I have referred to these glass protectors in some cases as lenses, it will be understood that they are not necessarily of curved or warped surfaces and do not necessarily perform any refractive function, since in many cases they will be made of plane glass and simply perform the function of protecting the eyes from excessive glare or from the injurious effect of certain kinds of light rays, or from the entrance of particles of dust, etc., into the eyes.

The lens holders 5 and 6 have their back edges 9 and 10 of suitable curvature or contour to seat evenly against the face of the wearer, and thereby most effectually protect the eyes against the entrance of dust particles, etc. Straps or the like 11 and 12 are connected to the outer portions of the guards 5 and 6, so that said straps may be passed around the back of the wearer's head for the purpose of holding the goggles in position.

A flexible connection or bridge piece 13 serves to join the two halves of the goggles together, said bridge piece serving also as a support over the nose of the wearer.

I will now explain the construction and arrangement which I have invented for securing the lenses or glasses in position in the guards or holders and for joining the two guards to the bridge piece. Each of the guards or lenses is provided with an outwardly facing shoulder 14 shown particularly in Fig. 3 against which the corresponding lens or glass rests. A wire spring clip 15 is provided for holding the lens in place against said shoulder. For this purpose the guard is provided with the inner and outer slotted openings 16 and 17 through which portions of this spring clip 15 are passed so as to hold the spring clip firmly against the peripheral portion of the lens or glass. The spring clip is conveniently made in the form of a substantially circular clip of spring wire, its central portion 18 being so formed as to pass through the slotted opening 16 and provide an eye into which the bridge piece 13 may be connected. The outer ends 19 and 20 of the clip are bent outwardly to form hooks or lugs which may be set through the slotted openings 17 so as to lock the spring clip in place.

Ordinarily the clip 15 should have its arms bent or distorted somewhat in the manner shown in Fig. 4, being bent out or away from the plane, so that when the clip is forced into position against the periphery of the glass or lens, it will exert a substantially uniform pressure around the entire periphery of the latter.

It is to be observed that, by means of the arrangement herein illustrated and described, the clip performs the two functions of holding the glass in place, and also establishing the support or eye to which the bridge piece may be connected.

I claim:

1. A pair of goggles comprising, in combination, a pair of eye guards of cylindrical form having their inner edges formed of suitable contour to conform to the face of the wearer, each of said guards having an outwardly facing shoulder near its outer edge, and having diametrically opposite inner and outer slots adjacent to said shoulder, a glass or lens seated against the shoulder of each guard, a spring clip seated against the glass or lens of each guard, each of said clips comprising a spring member having its central portion suitably formed to provide an eye when passing through the inner slot of the guard and having its outer ends suitably formed for engagement with the outer slot of the guard, and a bridge piece joining together the eyes so formed in the two guards, substantially as described.

2. A pair of goggles comprising, in combination, a pair of cylindrical eye guards having their inner edges suitably formed to conform to the surface of the wearer, each guard having an outwardly facing shoulder adjacent to its other edge and having a pair of slotted openings adjacent to said opening, a lens or glass seated against the shoulder of each guard, a spring clip engaging the peripheral portion of each lens or glass and having portions adapted to engage the slotted openings aforesaid, a portion of each spring clip extending through the inner slotted openings of the guards, and a bridge piece joining together said portions, substantially as described.

3. A pair of goggles comprising, in combination, a pair of guards, each guard having an outwardly facing shoulder adjacent to its outer edge and having a slotted opening adjacent to said shoulder, a lens or glass seated against the shoulder of each guard, a spring clip in engagement with the peripheral portion of each lens or glass and having a portion extending through the slotted opening aforesaid, and a bridge piece joining together the two portions extending through the slotted openings of the two guards, substantially as described.

4. A pair of goggles comprising, in combination, a pair of cylindrical guards, each guard having a shoulder adjacent to its outer edge and having an opening adjacent to said shoulder, a spring clip in engagement with the peripheral portion of the glass or lens of each guard and having a portion extending through the opening aforesaid, and a bridge piece connecting together the two portions extending through the openings of the two guards, substantially as described.

5. A pair of goggles comprising, in combination, a pair of guards, each guard having a shoulder on its interior, a lens or glass in engagement with the shoulder of each guard, there being an opening adjacent to each shoulder, and a spring clip in engagement with the lens or glass of each guard and having a portion extending through the opening aforesaid for connection with a similar portion of the spring clip in the other guard, substantially as described.

GEO. S. JOHNSTON.